United States Patent [19]

Bagnall

[11] Patent Number: 4,964,844
[45] Date of Patent: Oct. 23, 1990

[54] GEARBOX ARRANGEMENT FOR DRIVING COAXIAL CONTRA ROTATING MULTI-BLADED ROTORS

[75] Inventor: Adam Bagnall, Derby, England
[73] Assignee: Rolls-Royce plc, London, England
[21] Appl. No.: 430,927
[22] Filed: Nov. 2, 1989

Related U.S. Application Data

[63] Continuation of Ser. No. 218,214, Jul. 13, 1988, abandoned.

[30] Foreign Application Priority Data

Sep. 5, 1987 [GB] United Kingdom ............... 8720903

[51] Int. Cl.⁵ ........................................... F16H 37/06
[52] U.S. Cl. ................................ 475/295; 475/311; 475/330; 475/332
[58] Field of Search ................ 74/674, 665 GA, 705, 74/781 R; 475/295, 311, 330, 332

[56] References Cited

U.S. PATENT DOCUMENTS

| 2,186,064 | 1/1940 | Dekker | 475/332 X |
| 2,401,365 | 6/1946 | Mercier | 475/330 X |
| 2,522,443 | 9/1950 | Gaubatz et al. | 475/332 |
| 2,531,032 | 11/1950 | Desmoulins | 74/674 |
| 2,543,453 | 2/1951 | Fuller | 74/674 |
| 2,547,161 | 4/1951 | Johnson | 74/674 |
| 2,583,872 | 1/1952 | Newcomb | 74/674 X |
| 2,700,311 | 1/1955 | Bade | 74/674 |
| 2,804,748 | 9/1957 | Hutchinson | 74/674 X |

FOREIGN PATENT DOCUMENTS

| 0847738 | 2/1941 | France | 74/674 |
| 1264435 | 5/1961 | France | 74/665 GA |
| 1540855 | 5/1969 | France. | |
| 0441927 | 11/1948 | Italy | 74/674 |
| 586557 | 3/1947 | United Kingdom. | |
| 636702 | 5/1950 | United Kingdom. | |
| 878934 | 10/1961 | United Kingdom. | |
| 1309721 | 3/1973 | United Kingdom. | |
| 2117054 | 10/1983 | United Kingdom. | |
| 2138507 | 10/1984 | United Kingdom. | |
| 2150980 | 12/1984 | United Kingdom. | |
| 2145777 | 4/1985 | United Kingdom. | |
| 2173863 | 4/1985 | United Kingdom. | |
| 2169968 | 7/1986 | United Kingdom. | |
| 2182397 | 9/1986 | United Kingdom. | |
| 2179702 | 3/1987 | United Kingdom. | |
| 2186918 | 8/1987 | United Kingdom. | |

Primary Examiner—Rodney H. Bonck
Assistant Examiner—Benjamin Levi
Attorney, Agent, or Firm—Cushman, Darby & Cushman

[57] ABSTRACT

The invention relates to a gearbox arrangement for driving a first multi-bladed rotor and a second coaxial multi-bladed rotor in opposite directions.

The gearbox assembly comprises a first epicyclic gear arrangement and a coaxial second epicyclic gear arrangement. The first epicyclic gear arrangement is driven by a first input shaft, and the second epicyclic gear has a static second input shaft. The first epicyclic gear arrangement is drivingly connected to the first multi-bladed rotor and the second epicyclic gear arrangement is drivingly connected to the second multi-bladed rotor. The first epicyclic gear arrangement is interconnected to the second epicyclic gear arrangement so that the first and second multi-bladed rotors are driven in opposite directions. It is preferred that the first and second epicyclic gear arrangements are dimensioned and configured to drive the first and second multi-bladed rotors with equal and opposite torques, so that the static carrying structure can be of reduced strength and weight.

6 Claims, 4 Drawing Sheets

GEARBOX ARRANGEMENT FOR DRIVING COAXIAL CONTRA ROTATING MULTI-BLADED ROTORS

This is a continuation of application Ser. No. 218,214, filed July 13, 1988, which was abandoned upon the filing hereof.

The present invention relates to a gearbox arrangement for driving a first multi-bladed rotor and a second coaxial multi-bladed rotor in opposite rotational directions, and is particularly concerned with a gearbox for driving first and second multi-bladed propellers in opposite rotational directions or for driving first and second multi-bladed fans in opposite rotational directions.

In one prior art gearbox arrangement for driving first and second multi-bladed propellers in opposite rotational directions, for example as shown in published British Pat. applications Nos. GB2145777A, GB2150980A and our published British Pat. applications Nos. GB2173863A and GB2182397A, a simple epicyclic differential gearbox arrangement is used. In this type of gearbox arrangement a sun gear is driven by an input driving shaft, a plurality of planet gears mesh with and are driven by the sun gear, and an annulus gear meshes with and is driven by the planet gears. The planet gears are rotatably mounted on a carrier, the carrier is free to rotate and is driven by the planet gears in the opposite rotational direction to the annulus gear. The annulus gear and carrier are drivingly connected to the first and second multi-bladed propellers, and drive them in opposite rotational directions. This prior art gearbox arrangement must have output torques, i.e. the torques of the propellers, which are different by the value of the input torque, i.e. the torque of the input shaft, this is because all the torques in an epicyclic differential gearbox must add up to zero.

The present invention seeks to provide a new gearbox arrangement for driving a first multi-bladed rotor and a coaxial second multi-bladed rotor in opposite rotational directions in which the feature of the first multi bladed rotor and second multi-bladed rotor being driven with equal and opposite torques is a preferred option.

Accordingly the present invention provides a gearbox arrangement for driving a first multi-bladed rotor and a coaxial second multi-bladed rotor in opposite rotational directions comprising a first epicyclic gear arrangement and a coaxial second epicyclic gear arrangement, the first epicyclic gear arrangement comprising a first sun gear, a plurality of first planet gears meshing with the first sun gear, a first annulus gear meshing with the plurality of first planet gears, the plurality of first planet gears being rotatably mounted on a first carrier, the second epicyclic gear arrangement comprising a second sun gear, a plurality of second planet gears meshing with the second sun gear, a second annulus gear meshing with the plurality of second planet gears, the plurality of second planet gears being rotatably mounted on a second carrier, a first input shaft means being drivingly connected to the first epicyclic gear arrangement, a second input shaft means being connected to the second epicyclic gear arrangement, the second input shaft means being static, the first epicyclic gear arrangement being drivingly connected to the first multi-bladed rotor, the second epicyclic gear arrangement being drivingly connected to the second multi-bladed rotor, the first epicyclic gear arrangement and second epicyclic gear arrangement being drivingly interconnected whereby the first multi-bladed rotor and second multi-bladed rotor are driven in opposite rotational directions.

The first input shaft means may be drivingly connected to the first sun gear, the second fixed input shaft means is connected to the second sun gear, the first annulus gear is drivingly connected to the first multi-bladed rotor, the second annulus gear is drivingly connected to the second multi-bladed rotor, and the first carrier and the second carrier are drivingly interconnected.

The first input shaft means may be drivingly connected to the first sun gear, the second fixed input shaft means is connected to the second sun gear, the first carrier is drivingly connected to the first multi-bladed rotor, the second carrier is drivingly connected to the second multi-bladed rotor, and the first annulus gear and the second annulus gear are drivingly interconnected.

The first input shaft means may be drivingly connected to the first annulus gear, the second fixed input shaft means is connected to the second annulus gear, the first carrier is drivingly connected to the first multi-bladed rotor, the second carrier is drivingly connected to the second multi-bladed rotor, and the second sun gear and the first sun gear are drivingly interconnected.

The first input shaft means may be drivingly connected to the first annulus gear, the second fixed input shaft means is connected to the second annulus gear, the first sun gear is drivingly connected to the first multi-bladed rotor, the second sun gear is drivingly connected to the second multi-bladed rotor, and the second carrier and the first carrier are drivingly interconnected.

The first input shaft means may be drivingly connected to the first carrier, the second fixed input shaft means is connected to the second carrier, the first annulus gear is drivingly connected to the first multi-bladed rotor, the second annulus gear is drivingly connected to the second multi-bladed rotor, and the second sun gear and the first sun gear are drivingly interconnected.

The first input shaft means may be drivingly connected to the first carrier, the second fixed input shaft means is connected to the second carrier, the first sun gear is drivingly connected to the first multi-bladed rotor, the second sun gear is drivingly connected to the second multi-bladed rotor, and the second annulus gear and the first annulus gear are drivingly interconnected The first epicyclic gear arrangement and the second epicyclic gear arrangement may be dimensioned and configured whereby the first multi-bladed rotor and the second multi-bladed rotor are driven in opposite rotational directions with equal and opposite torques.

The gearbox arrangement may be positioned axially between the first multi-bladed propeller and the second multi-bladed propeller.

The first and second multi-bladed rotors may be first and second multi-bladed propellers. The first and second multi-bladed rotors may be first and second multi-bladed fans.

The present invention will be more fully described by way of example with reference to the accompanying drawings in which:

FIG. 7 is a cross-sectional view to an enlarged scale of a final embodiment of a gearbox arrangement shown in FIG. 1 or FIG. 2.

Figure 1:
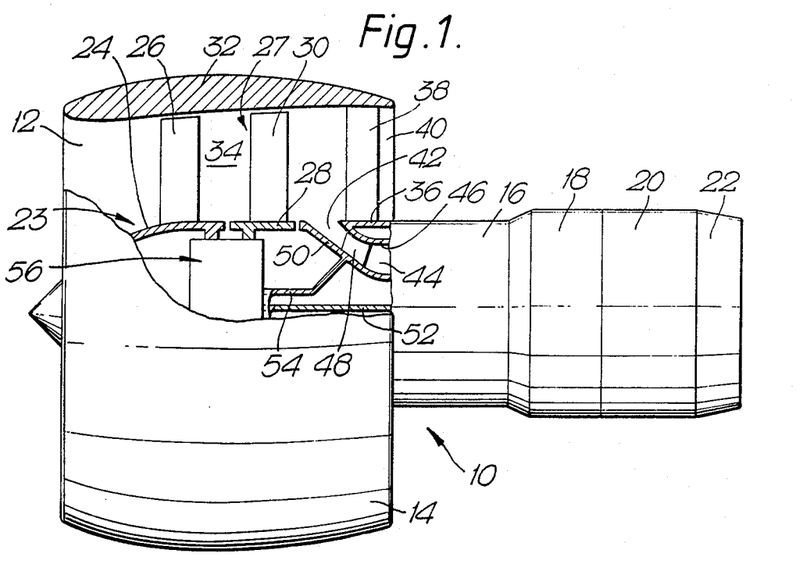
FIG. 1 is a partially cut away view of a turbofan gas turbine engine having a gearbox arrangement for driving contra rotating multi-bladed rotors according to the present invention.

A turbofan gas turbine engine 10 is shown in FIG. 1 and comprises in axial flow series an intake 12, a fan assembly 14, a compressor or compressors 16, a combustor assembly 18, turbines 20 and an exhaust nozzle 22.

The fan assembly 14 comprises a first multi-bladed fan rotor 23 and a second multi-bladed fan rotor 27 positioned coaxially within a fan casing 32. The first multi-bladed fan rotor 23 comprises a first fan rotor 24 which carries a plurality of circumferentially spaced radially extending first fan blades 26, and the second multi-bladed fan rotor 27 comprises a second fan rotor 28 which carries a plurality or circumferentially spaced radially extending second fan blades 30. The fan casing 32 defines the radially outer surface of a fan duct 34, and the fan casing 32 is secured to the upstream end of a casing 36 by a plurality of circumferentially spaced radially extending outlet guide vanes 38. The casing 36 encloses the compressor 16, combustor assembly 18 and the turbines 20. The downstream end of the fan casing 32 defines an outlet 40 for the fan duct 34.

An annular intake 42 is positioned axially between the second fan rotor 28 and the upstream end of the casing 36, and an annular duct 44 communicates between the annular intake 42 and the compressor 16 for supplying a portion of the air flowing through the fan duct 34 to the compressor 16. The annular duct 44 is defined by an outer wall 46, which is secured to the casing 36 and an inner wall 50 which is secured to the outer wall 46 by a plurality of radially extending struts or vanes 48.

The first multi-bladed fan rotor 23 and the second multi-bladed fan rotor 27 are arranged to be driven in opposite rotational directions by a gearbox arrangement 56. A first input shaft 52 and a second input shaft 54 are provided for the gearbox arrangement 56. The first input shaft 52 is driven by the turbines 20, and the second input shaft 54 is secured to a static, i.e. non rotating structure in this example the inner wall 50, and via the struts 48 to the casing 36.

The turbofan gas turbine engine 10 operates quite conventionally in that air is initially compressed by the fan assembly 14, and a portion of the air is further compressed by the compressor 16 and is then supplied to the combustor assembly 18. Fuel is burnt in the combustor assembly 18 in the air to produce hot gases which flow through and drive the turbines 20 before passing to the atmosphere through the exhaust nozzle 22. The turbines 20 are drivingly connected to the compressor 16 and fan assembly 14.

Figure 2:
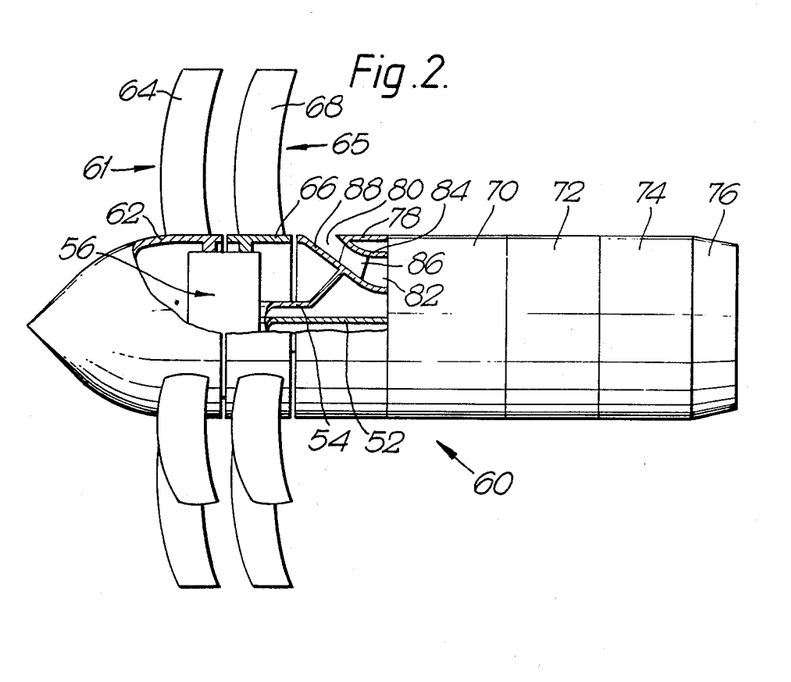
FIG. 2 is a partially cut away view of a turbo-propeller gas turbine engine having a gearbox arrangement for driving contra rotating multi-bladed rotors according to the present invention.

A turbo-propeller gas turbine engine 60 is shown in FIG. 2 and comprises in axial flow series a first multi-bladed propeller rotor 61, a second multi-bladed propeller rotor 65, an intake 80, a compressor or compressors 70, a combustor arrangement 72, turbines 74 and an exhaust nozzle 76.

The first multi-bladed propeller rotor 61 comprises a first propeller rotor 62 which carries a plurality of circumferentially spaced radially extending first propeller blades 64. The second multi-bladed propeller rotor 65 comprises a second propeller rotor 66 which carries a plurality of circumferentially spaced radially extending second propeller blades 68.

The annular intake 80 is positioned axially between the second propeller rotor 66 and the upstream end of a casing 78, which encloses the compressor 70, the combustor assembly 72 and the turbines 74. An annular duct 82 communicates between the annular intake 80 and the compressor 70 for supplying air to the compressor 70. The annular duct 82 is defined by an outer wall 84, which is secured to the casing 78, and an inner wall 88 which is secured to the outer wall 84 by a plurality of radially extending struts or vanes 86.

The first multi-bladed propeller rotor 61 and the second multi-bladed propeller rotor 65 are arranged to be driven in opposite rotational directions by a gearbox arrangement 56, a first input shaft 52 and a second input shaft 54 are provided for the gearbox arrangement 56. The first input shaft 52 is driven by the turbines 74 and the second input shaft 54 is secured to a static structure in this example the wall 88.

The turbo-propeller gas turbine engine 60 operates quite conventionally.

Figure 3:
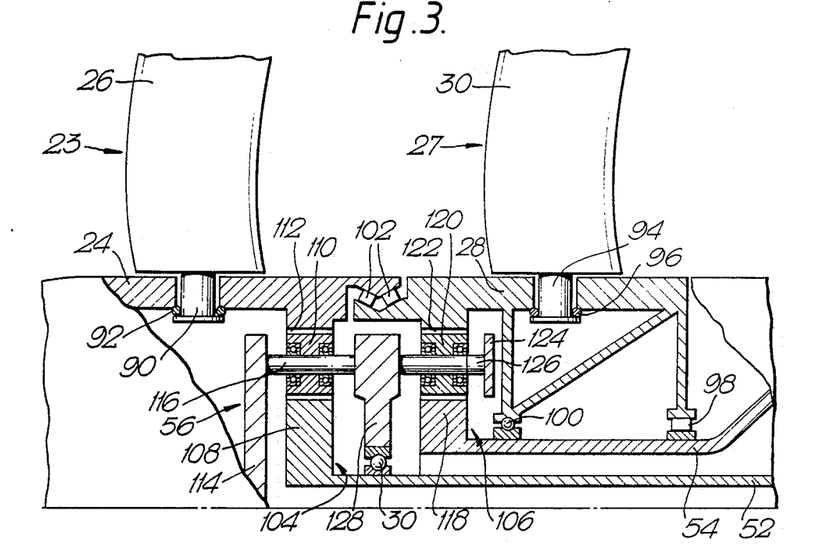
FIG. 3 is a cross-sectional view to an enlarged scale of a first embodiment of a gearbox arrangement shown in FIG. 1 or FIG. 2.

The gearbox arrangement 56 for driving the first multi-bladed fan rotor 23 and the second multi-bladed fan rotor 27 in opposite rotational directions, or for driving the first multi-bladed propeller rotor 61 and the second multi-bladed propeller rotor 65 in opposite rotational directions, is shown more clearly in FIG. 3, although reference is made only to the first and second multi-bladed fan rotors 23 and 27.

The first fan blades 26 have root portions 90 which are rotatably mounted on the first fan rotor 24 by ball bearings 92 or other suitable bearing means, similarly the second fan blades 30 have root portions 94 which are rotatably mounted on the second fan rotor 28 by ball bearings 96.

The second fan rotor 28 is rotatably mounted on the second input shaft 54 by axially spaced roller bearing 98 and ball bearing 100, and the first fan rotor 24 is rotatably mounted on the second fan rotor 28 by taper roller bearings 102 or other suitable bearing means.

The gearbox arrangement 56 comprises a first epicyclic gear arrangement 104 and a coaxial second epicyclic gear arrangement 106.

The first epicyclic gear arrangement 104 comprises a first sun gear 108 which is integral with or is secured to the first input shaft 52, a plurality of first planet gears 110 which mesh with the first sun gear 108 and a first annulus gear 112 which meshes with the first planet gears 110. The first planet gears 110 are rotatably mounted on a first carrier 114, the first planet gears 110 are rotatably mounted on spindles 116 which extend axially from and are secured to the first carrier 114. The first carrier 114 is free to rotate, and the first annulus.

gear 112 is drivingly connected to the first fan rotor 24 to drive the first multi-bladed fan rotor 23.

The second epicyclic gear arrangement 106 comprises a second sun gear 118 which is integral with or is secured to the second input shaft 54, a plurality of second planet gears 120 which mesh with the second sun gear 118 and a second annulus gear 122 which meshes with the second planet gears 120. The second planet gears 120 are rotatably mounted on a second carrier 124, the second planet gears 120 are rotatably mounted on spindles 126 which extend axially from and are secured to the second carrier 124. The second carrier 124 is free to rotate, and the second annulus gear 122 is drivingly connected to the second fan rotor 28 to drive the second multi-bladed fan rotor 27.

The first and second epicyclic gear arrangements 104 and 106 are drivingly interconnected, in this embodiment the first carrier 114 of the first epicyclic gear arrangement 104 is integral with or secured to the second carrier 124 of the second epicyclic gear arrangement 106 so that they rotate as a single unit. The spindles 116 of the first carrier 114 and the spindles 126, of the second carrier 124 are secured to a third carrier 128 positioned axially between the first and second epicyclic gear arrangements 104 and 106. The third carrier 128 is rotatably mounted on the first input shaft 52 by a ball bearing 130.

In operation the first input shaft 52 is driven in one rotational direction, this drives the first annulus gear 112 and the first multi-bladed fan rotor 23 in the opposite direction, but the first carrier 114 rotates in the same direction as the first input shaft 52. The second carrier 124 rotates with the first carrier 114 and because the second input shaft 54 is static the second annulus gear 122 and second multi-bladed fan rotor 27 are driven in the same direction as the second carrier 124, that is in the opposite direction to the first multi-bladed fan rotor 23.

It is to be noted that the first carrier 114 receives a torque which is numerically equal to the torque of the first input shaft 52 plus the torque of the first multi-bladed fan rotor 23. The torque of the second carrier 124 is equal to that of the first carrier 114, because they are connected. The torque of the second carrier 124 is one input to the second epicyclic gear arrangement 106, and the second input shaft 54 forms a second input to the second epicyclic gear arrangement 106. The second multi-bladed fan rotor 27 receives a torque which is numerically equal to the torque of the second carrier 124 minus the torque of the second input shaft 54. The first multi-bladed fan rotor 23 and the second multi-bladed fan rotor 27 therefore receive equal and opposite torques, independently of their rotational speeds, but it is determined by the ratios of numbers of teeth on the gears and the input torque of the first input shaft 52. The static second input shaft 54 experiences a torque exactly equal and opposite to the input torque of the first input shaft 52. It follows that the torques of the first input shaft 52, the second input shaft 54, the first multi-bladed fan rotor 23 and the second multi-bladed fan rotor 27 add up to zero. Let $T_A$ = Torque of the first input shaft 52 $T_B$ = Torque of the second input shaft 54 $T_C$ = Torque of the first annulus gear 112 $T_D$ = Torque of the second annulus gear 122 $T_E$ = Torque of the first carrier 114 $T_F$ = Torque of the second carrier 124, and let $R_A$ = The radius of the first sun gear 108 $R_B$ = The radius of the second sun gear 118 $R_C$ = The radius of the first annulus gear 112 $R_D$ = The radius of the second annulus gear 122

Then the torque ratio between the first input shaft 52 and the first multi-bladed fan rotor 23;

$$T_C = T_A \times \frac{R_C}{R_A}$$

and $$T_E = -(T_C + T_A)$$

$$T_E = -T_A \left(1 + \frac{R_C}{R_A}\right)$$

Similarly the torque ratio between the second input shaft 54 and the second multi-bladed fan rotor 27 is $$T_D = T_B \times \frac{R_D}{R_B}$$

and $$T_F = -(T_D + T_B)$$

therefore $$T_F = -T_B \left(1 + \frac{R_D}{R_B}\right)$$

But the first carrier 114 and the second carrier 124 are interconnected, so that $T_F = -T_E$
therefore $$T_A = -T_B \frac{\left(1 + \frac{R_D}{R_B}\right)}{\left(1 + \frac{R_C}{R_A}\right)}$$

but $$\frac{R_C}{R_A} = \frac{R_D}{R_B} = K$$

therefore $$T_A = -T_B$$
$$T_C = K \times T_A$$

and $$T_D = -K \times T_A$$

i.e. the first multi-bladed fan rotor 23 and the second multi-bladed fan rotor 27 receive equal and opposite torques.

The rotational speeds of the first and second multi-bladed fan rotors 23 and 27 are not fixed, but the relationship between the rotational speeds of the first and second multi-bladed fan rotors 23 and 27 and the first and second input shafts 52 and 54 is determined by the geometry Let $N_A$ = The rotational speed of the first input shaft 52

$N_B$ = The rotational speed of the second input shaft 54

$N_C$ = The rotational speed of the first annulus gear 112

$N_D$ = The rotational speed of the second annulus gear 122

$N_E$ = The rotational speed of the first carrier 114

$N_F$ = The rotational speed of the second carrier 124

$$N_C = \left(N_A \times \frac{-R_A}{R_C}\right) + \left(N_E \times 2 \times \frac{(R_A + R_C)}{2R_C}\right)$$

$$N_D = \left(N_B \times \frac{-R_B}{R_D}\right) + \left(N_F \times 2 \times \frac{(R_B + R_D)}{2R_D}\right)$$

but $$N_B = 0; \quad N_E = N_F; \quad \frac{R_A}{R_C} = \frac{R_B}{R_D} = \frac{1}{K}$$

therefore $$N_C = -\frac{N_A}{K} + N_E(1 + 1/K)$$

and $$N_D = N_F(1 + 1/K) = N_E(1 + 1/K) = N_C + \frac{N_A}{K}$$

or $$N_D - N_C = \frac{N_A}{K}$$

Now, if we control the first and second multi-bladed fan rotors 23 and 27 so that they have equal and opposite rotational speeds i.e. $N_C = -N_D$ $$2N_D = \frac{N_A}{K}$$

$$N_D = \frac{N_A}{2K} \text{ and } N_C = -\frac{N_A}{2K}$$

i.e. The nominal gear ratio, R, can now be defined as:

$$R = \frac{N_A}{N_D} = -\frac{N_A}{N_C} = 2K = 2\frac{R_C}{R_A} = 2\frac{R_D}{R_B}$$

Figure 4:
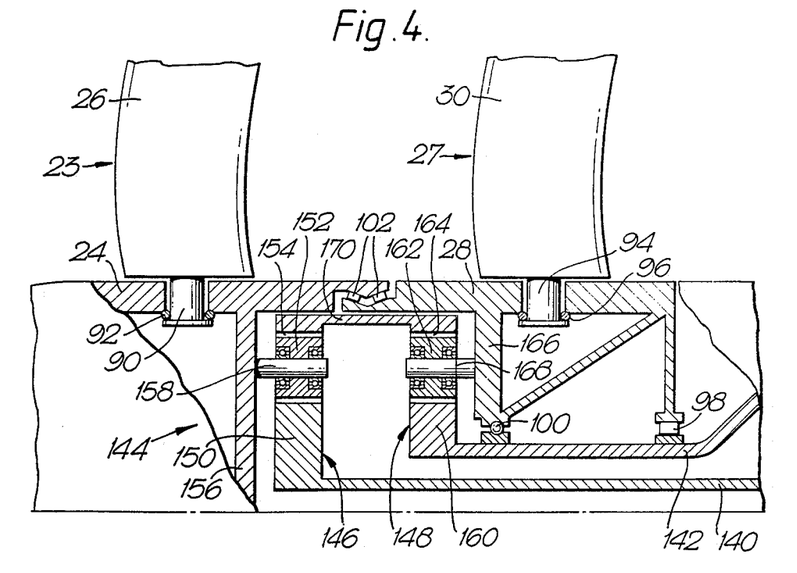
FIG. 4 is a cross-sectional view to an enlarged scale of a second embodiment of a gearbox arrangement shown in FIG. 1 or FIG. 2.

An alternative gearbox arrangement 144 for driving the first multi-bladed fan rotor 23 and the second multi-bladed fan rotor 27 in opposite rotational directions, or for driving the first multi-bladed propeller rotor 61 and the second multi-bladed propeller rotor 65 in opposite rotational directions is shown in FIG. 4, but reference is made only to the first and second multi-bladed fan rotors 23 and 27.

As shown in FIG. 4 the first fan blades 26 have root portions 90 which are rotatably mounted on the first fan rotor 24 by ball bearings 92, and similarly the second fan blades 30 have root portions 94 which are rotatably mounted on the second fan rotor 28 by ball bearings 96.

The second fan rotor 28 is rotatably mounted on the second input shaft 142 by axially spaced roller bearing 98 and ball bearing 100, and the first fan rotor 24 is rotatably mounted on the second fan rotor 28 by taper roller bearings 102 or other suitable bearings.

The gearbox arrangement 144 comprises a first epicyclic gear arrangement 146 and a coaxial second epicyclic gear arrangement 148.

The first epicyclic gear arrangement 146 comprises a first sun gear 150 which is integral with or is secured to a first input shaft 140, a plurality of first planet gears 152 which mesh with the first sun gear 150 and a first annulus gear 154 which meshes with the first planet gears 152. The first planet gears 152 are rotatably mounted on a first carrier 156, the first planet gears 152 are rotatably mounted on spindles 158 which extend axially from and are secured to the first carrier 156. The first carrier 156 is free to rotate, and is drivingly connected to the first fan rotor 24 to drive the first multi-bladed fan rotor 23.

The second epicyclic gear arrangement 148 comprises a second sun gear 160 which is integral with or is secured to the second static input shaft 142, a plurality of second planet gears 162 which mesh with the second sun gear 160 and a second annulus gear 164 which meshes with the second planet gears 162. The second planet gears 162 are rotatably mounted on spindles 168 which extend axially from and are secured to the second carrier 166. The second carrier 166 is free to rotate, and is drivingly connected to the second fan rotor 28 to drive the second multi-bladed fan rotor 27.

The first and second epicyclic gear arrangements 146 and 148 are drivingly interconnected, in this embodiment the first annulus gear 154 is integral with or is secured to the second annulus gear 164 so that they rotate as a single unit. The first annulus gear 154 and the second annulus gear 164 are secured to each other by an axially extending member 170.

In operation the first input shaft 140 and first sun gear 150 are driven in one direction, this drives the first carrier 156 and the first multi-bladed fan rotor 23 in the same rotational direction, but the first annulus gear 154 rotates in the opposite direction to the first input shaft 140. The second annulus gear 164 rotates with the first annulus gear 154 and because the second input shaft 142 and second sun gear 160 are static the second carrier 166 and the second multi-bladed fan rotor 23 are driven in the opposite direction to the first carrier 156 and the first multi-bladed fan rotor 23.

As in the gearbox arrangement in FIG. 3, the first multi-bladed fan rotor 23 and the second multi-bladed fan rotor 27 receive equal and opposite torques.

Figure 5:
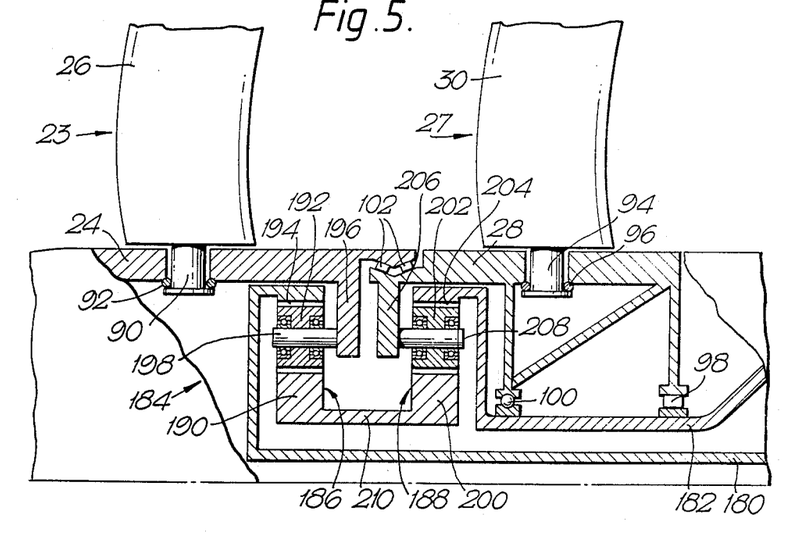
FIG. 5 is a cross-sectional view to an enlarged scale of a third embodiment of a gearbox arrangement shown in FIG. 1 or FIG. 2.

A third gearbox arrangement 184 for driving the first multi-bladed fan rotor 23 and the second multi-bladed fan rotor 27 in opposite rotational directions, or for driving the first multi-bladed propeller rotor 61 and the second multi-bladed propeller rotor 65 in opposite rotational directions is shown in FIG. 5.

The gearbox arrangement 184 comprises a first epicyclic gear arrangement 186 and a coaxial second epicyclic gear arrangement 188.

The first epicyclic gear arrangement 186 comprises a first sun gear 190, a plurality of first planet gears 192 which mesh with the first sun gear 190 and a first annulus gear 194 which meshes with the first planet gears 192. The first planet gears 192 are rotatably mounted on spindles 198 which extend axially from and are secured to a first carrier 196. The first carrier 196 is free to rotate, and is drivingly connected to the first fan rotor 24 to drive the first multi-bladed fan rotor 23. The first annulus gear 194 is integral with or is secured to a first input shaft 180.

The second epicyclic gear arrangement 188 comprises a second sun gear 200, a plurality of second planet gears 202 which mesh with the second sun gear 200 and a second annulus gear 204 which meshes with the second planet gears 202. The second planet gears 202 are rotatably mounted on spindles 208 which extend axially from and are secured to a second carrier 206. The second carrier 206 is free to rotate, and is drivingly connected to the second fan rotor 28 to drive the second multi-bladed fan rotor 27. The second annulus gear 204 is integral with or is secured to a second static input shaft 182.

The first and second epicyclic gear arrangements 186 and 188 are drivingly interconnected, in this embodiment the first sun gear 190 is integral with or is secured to the second sun gear 200 so that they rotate as a single unit. The first sun gear 190 and the second sun gear 200 are secured to each other by an axially extending member 210.

In operation the first input shaft 180 and first annulus gear 194 are driven in one direction, this drives the first carrier 196 and the first multi-bladed fan rotor 23 in the opposite rotational direction, and the first sun gear 190 also rotates in the opposite rotational direction to the annulus gear 194. The second sun gear 200 rotates with the first sun gear 190 and because the second input shaft 182 and the second annulus gear 204 are static the second carrier 206 and the second multi-bladed fan rotor 27 are driven in the opposite direction to the first carrier 196 and the first multi-bladed fan rotor 23.

This gearbox arrangement also ensures that the first multi-bladed fan rotor 23 and the second multi-bladed fan rotor 27 receive equal and opposite torques.

Figure 6:
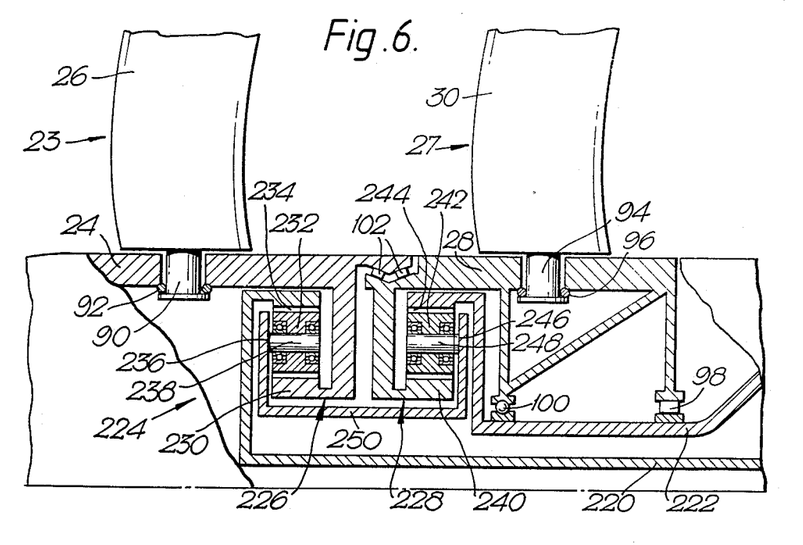
FIG. 6 is a cross-sectional view to an enlarged scale of a fourth embodiment of a gearbox arrangement shown in FIG. 1 or FIG. 2.

A fourth gearbox arrangement 224 for driving the first multi-bladed fan rotor 23 and the second multi-bladed fan rotor 27 in opposite rotational directions is shown in FIG. 6.

The gearbox arrangement 224 comprises a first epicyclic gear arrangement 226 and a coaxial second epicyclic arrangement 228.

The first epicyclic gear arrangement comprises a first sun gear 230, a plurality of first planet gears 232 which mesh with the first sun gear 230 and a first annulus gear 234 which meshes with the first planet gears 232. The first planet gears 232 are rotatably mounted on spindles 238 which extend axially from and are secured to a first carrier 236. The first sun gear 230 is free to rotate, and is drivingly connected to the first fan rotor 24 to drive the first multi-bladed fan rotor 23. The first annulus gear 234 is integral with or is secured to a first input shaft 220.

The second epicyclic gear arrangement 228 comprises a second sun gear 240, a plurality of second planet gears 242 which mesh with the second sun gear 240 and a second annulus gear 244 which meshes with the second planet gears 242. The second planet gears 242 are rotatably mounted on spindles 248 which extend axially from and are secured to a second carrier 246. The second sun gear 240 is free to rotate, and is drivingly connected to the second fan rotor 28 to drive the second multi-bladed fan rotor 27. The second annulus gear 244 is integral with or is secured to a second static input shaft 222.

The first carrier 236 is integral with or is secured to the second carrier 246 so that they rotate as a single unit, the first carrier 236 and the second carrier 246 are secured to each other by an axially extending member 250.

Figure 7:
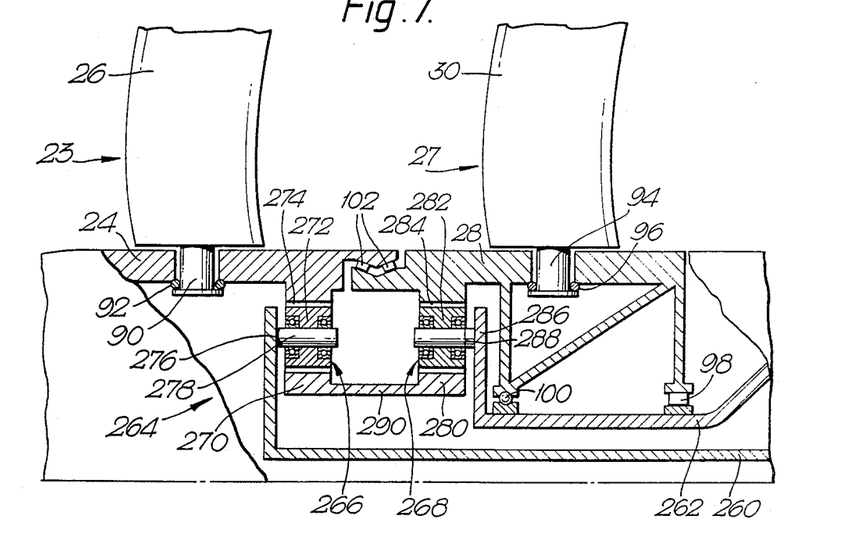
FIG. 7 is a cross-sectional view to an enlarged scale of a fifth embodiment of a gearbox arrangement shown in FIG. 1 or FIG. 2.

A fifth gearbox arrangement 264 for driving the first multi-bladed fan rotor 23 and the second multi-bladed fan rotor 27 in opposite rotational directions is shown in FIG. 7.

The gearbox arrangement 264 comprises a first epicyclic gear arrangement 266 and a second coaxial epicyclic gear arrangement 268.

The first epicyclic gear arrangement 266 comprises a first sun gear 270, a plurality of first planet gears 272 which mesh with the first sun gear 270 and a first annulus gear 274 which meshes with the first planet gears 272. The first planet gears 272 are rotatably mounted on spindles 278 which extend axially from and are secured to a first carrier 276. The first annulus gear 274 is free to rotate, and is drivingly connected to the first fan rotor 24 to drive the first multi-bladed fan rotor 23. The first carrier 276 is integral with or is secured to a first input shaft 260.

The second epicyclic gear arrangement 268 comprises a second sun gear 280, a plurality of second planet gears 282 which mesh with the second sun gear 280 and a second annulus gear 284 which meshes with the second planet gears 282. The second planet gears 282 are rotatably mounted on spindles 288 which extend axially from and are secured to a second carrier 286. The second annulus gear 284 is free to rotate, and is drivingly connected to the second fan rotor 28 to drive the second multi-bladed fan rotor 27. The second carrier 286 is integral with or is secured to a second static input shaft 262.

The first sun gear 270 is integral with or is secured to the second sun gear 280 so that they rotate as a single unit, the first sun gear 270 and the second sun gear 280 are secured to each other by an axially extending member 290.

Figure 8:
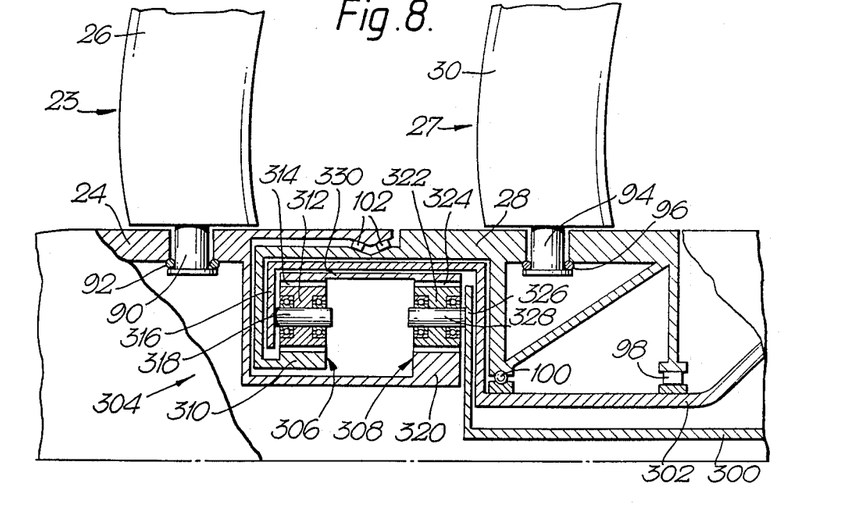

A final gearbox arrangement 304 for driving the first multi-bladed fan rotor 23 and the second multi-bladed fan rotor 27 in opposite rotational directions is shown in FIG. 8.

The gearbox arrangement 304 comprises a first epicyclic gear arrangement 308 and a coaxial second epicyclic gear arrangement 306.

The first epicyclic gear arrangement 308 comprises a first sun gear 320, a plurality of first planet gears 322 which mesh with the first sun gear 320 and a first annulus gear 324 which meshes with the first planet gears 322. The first planet gears 322 are rotatably mounted on spindles 328 which extend axially from and are secured to a first carrier 326. The first sun gear 320 is free to rotate, and is drivingly connected to the first fan rotor 24 to drive the first multi-bladed fan rotor 23. The first carrier 326 is integral with or is secured to a first input shaft 300.

The second epicyclic gear arrangement 306 comprises a second sun gear 310, a plurality of second planet gears 312, which mesh with the second sun gear 310 and a second annulus gear 314 which meshes with the second planet gears 312. The second planet gears 312 are rotatably mounted on spindles 318 which extend axially from and are secured to a second carrier 316. The second sun gear 310 is free to rotate, and is drivingly connected to the second fan rotor 28 to drive the second multi-bladed fan rotor 27. The second carrier 316 is integral with or is secured to a second static input shaft 302.

The first annulus gear 324 is integral with or is secured to the second annulus gear 314 so that they rotate as a single unit, the first annulus gear 324 and the second annulus gear 314 are secured to each other by an axially extending member 330.

The gearbox arrangements described have two counter rotating outputs which at all times have equal and opposite torques independently of their rotational speeds. The numerical average of the two output speeds is fixed, but the speed split may be chosen to suite the demands of the two blade rows.

One advantage of having two counter rotating multi-bladed fan rotors, or propeller rotors with equal torques is that the engine structure required to carry the counter rotating multi-bladed fan rotors, or propeller rotors, may be of reduced strength and weight, as it is not required to take any torque loads. Another advantage is that the swirl energy imparted to the airstream by the first multi-bladed fan rotor, or propeller rotor, would be completely removed from the airstream by the second multi-bladed fan rotor, or propeller rotor, without the use of guide vanes.

Another advantage is that the speed split between the two blade rows, fans or propellers, is free to be chosen by the demands of the fans or propellers.

The gearbox arrangements as described could be dimensionally changed, i.e. changing the gear ratios, to alter the torque split between the counter rotating multi-bladed fan rotors, or propeller rotors, if this was considered desirable in a particular turbofan or turbopropeller arrangement.

The gearbox arrangement has been positioned axially between the first multi-bladed fan rotor and the second multi-bladed fan rotor in the examples, but it could equally well be positioned upstream or downstream of the first and second multi-bladed fan rotors or multi-bladed propeller rotors.

I claim:

1. A gearbox arrangement for driving a first multi-bladed rotor and a coaxial second multi-bladed rotor in opposite rotational directions comprising a first epicylic gear and a coaxial second epicyclic gear, the first epicyclic gear comprising a first sun gear, a plurality of first planet gears, a first annulus gear and a first carrier, the plurality of first planet gears meshing with the first sun gear, the first annulus gear meshing with the plurality of first planet gears, the plurality of first planet gears being rotatably mounted on the first carrier, the second epicyclic gear comprising a second sun gear, a plurality of second planet gears, a second annulus gear and a second carrier, the plurality of second planet gears meshing with the second sun gear, the second annulus gear meshing with the plurality of second planet gears, the plurality of second planet gears being rotatably mounted on the second carrier, a first input shaft being drivingly connected to the first epicyclic gear, a second fixed input shaft being connected to the second epicyclic gear, the second input shaft being static, a first epicyclic gear being directly drivingly connected to the first multi-bladed rotor, the second epicyclic gear being directly drivingly connected to the second multi-bladed rotor, the first annulus gear of the first epicyclic gear being integrally formed with the second annulus gear of the second epicyclic gear whereby the first multi-bladed rotor and the second multi-bladed rotor are driven in opposite rotational directions.

2. A gearbox arrangement as claimed in claim 1 in which the first epicyclic gear and the second epicyclic gear are dimensioned and configured whereby the first multi-bladed rotor and the second multi-bladed rotor are driven in opposite rotational directions with equal and opposite torques.

3. A gearbox arrangement is claimed in claim 1 in which the gearbox is positioned axially between the first multi-bladed rotor and the second multi-bladed rotor.

4. A gearbox arrangement as claimed in claim 1 in which the first and second multi-bladed rotors are first and second multi-bladed propellers.

5. A gearbox arrangement as claimed in claim 1 in which the first and second multi-bladed rotors are first and second multi-bladed fans.

6. A gearbox arrangement for driving a first multi-bladed rotor and a coaxial second multi-bladed rotor in opposite rotational directions comprising a first epicyclic gear and a coaxial second epicyclic gear, the first epicyclic gear comprising a first sun gear, a plurality of first planet gears, a first annulus gear and a first carrier, the plurality of first planet gears meshing with the first sun gear, the first annulus gear meshing with the plurality of first planet gears, the plurality of first planet gears being rotatably mounted on the first carrier, the second epicyclic gear comprising a second sun gear, a plurality of second planet gears, a second annulus gear and a second carrier, the plurality of second planet gears meshing with the second sun gear, the second annulus gear meshing with the plurality of second planet gears, the plurality of second planet gears being rotatably mounted on the second carrier, a first input shaft being drivingly connected to the first epicyclic gear, a second fixed input shaft being connected to the second epicyclic gear, the second input shaft being static, the first epicyclic gear being drivingly connected to the first multi-bladed rotor, the second epicyclic gear being drivingly connected to the second multi-bladed rotor, the first annulus gear o the first epicyclic gear being integrally formed with the second annulus gear of the second epicyclic gear whereby the first multi-bladed rotor and the second multi-bladed rotor are driven in opposite rotational directions, said first input shaft being drivingly connected to the first sun gear, the second fixed input shaft being connected to the second sun gear, the first carrier being drivingly connected to the first multi-bladed rotor, the second carrier being drivingly connected to the second multi-bladed rotor.

* * * * *